US012421078B2

(12) United States Patent
Li et al.

(10) Patent No.: US 12,421,078 B2
(45) Date of Patent: Sep. 23, 2025

(54) ELEVATOR CONTROL SYSTEM WITH RELIABILITY MONITORING

(71) Applicant: OTIS ELEVATOR COMPANY, Farmington, CT (US)

(72) Inventors: Zhenhong Li, New Britain, CT (US); Ben Guo, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1269 days.

(21) Appl. No.: 17/167,675

(22) Filed: Feb. 4, 2021

(65) Prior Publication Data

US 2022/0242696 A1 Aug. 4, 2022

(51) Int. Cl.

| | |
|---|---|
| ***B66B 1/34*** | (2006.01) |
| ***B66B 5/00*** | (2006.01) |
| ***B66B 5/02*** | (2006.01) |

(52) U.S. Cl.

CPC ............ *B66B 1/343* (2013.01); *B66B 5/0031* (2013.01); *B66B 5/02* (2013.01)

(58) Field of Classification Search

CPC .. B66B 1/28; B66B 1/30; B66B 1/302; B66B 1/306–32; B66B 1/3415–3453; B66B 1/46; B66B 5/00; B66B 5/0006; B66B 5/0018; B66B 5/0031; B66B 5/02; B66B 5/04; B66B 5/06; B66B 5/14; B66B 5/145

See application file for complete search history.

(56) References Cited

U.S. PATENT DOCUMENTS

| | | | | |
|---|---|---|---|---|
| 9,108,823 B2 * | 8/2015 | Washio | ................. | B66B 5/0031 |
| 10,442,660 B2 * | 10/2019 | Herkel | ...................... | B66B 1/32 |
| 2018/0215579 A1 * | 8/2018 | Knecht | ................... | B66B 13/22 |
| 2019/0300332 A1 * | 10/2019 | Koide | ................... | B66B 1/3415 |

* cited by examiner

*Primary Examiner* — Christopher Uhlir

(74) *Attorney, Agent, or Firm* — Carlson, Gaskey & Olds, P.C.

(57) ABSTRACT

An illustrative example embodiment of an elevator control system includes a drive configured to control power provided to an elevator machine, a machine power switch module configured to selectively disconnect power from the elevator machine, and a brake power switch module configured to selectively disconnect power from a brake associated with the elevator machine. A monitor module includes a first monitor unit and a second monitor unit. Each monitor unit is configured to monitor a condition of the machine power switch module and the brake power switch module. The monitor units each provide an output to the other monitor unit including a current condition of the machine power switch module and a current condition of the brake power switch module as detected by that monitoring unit. Each of the monitor units is configured to determine whether there is correspondence between the outputs.

14 Claims, 2 Drawing Sheets

ELEVATOR CONTROL SYSTEM WITH RELIABILITY MONITORING

BACKGROUND

Elevator systems include a machine that moves the elevator car. A brake associated with the machine prevents movement of the elevator car when the brake is applied. An elevator drive controls power supplied to the machine and brake. Under normal or acceptable conditions, the drive provides power to the machine and energizes the brake to control the position and movement of the elevator car. In typical elevator systems, energizing the brake lifts or releases the brake to allow the elevator car to move. Under some conditions it is necessary to apply or drop the brake. In such circumstances, the drive will cut power to the brake and the mechanical brake application mechanism, such as a spring, works to apply the brake and prevent movement of the elevator car. In such circumstances it is typically necessary to also cut power to the machine.

SUMMARY

An illustrative example embodiment of an elevator control system includes a drive configured to control power provided to an elevator machine, a machine power switch module configured to selectively disconnect the elevator machine from the power otherwise provided by the drive, and a brake power switch module configured to selectively disconnect a brake associated with the elevator machine from power otherwise provided to the brake. A monitor module includes a first monitor unit and a second monitor unit. Each monitor unit is configured to monitor a condition of each of the machine power switch module and the brake power switch module. The first monitor unit provides a first output to the second monitor unit including a current condition of the machine power switch module and a current condition of the brake power switch module as detected by the first monitoring unit. The second monitor unit provides a second output to the first monitor unit including a current condition of the machine power switch module and a current condition of the brake power switch module as detected by the second monitoring unit. Each of the monitor units is configured to determine whether there is correspondence between the first and second outputs.

In addition to one or more of the features described above, or as an alternative, the monitor module determines a fault condition when there is less than complete correspondence between the first and second outputs.

In addition to one or more of the features described above, or as an alternative, the monitor module disconnects a power supply to the drive when the fault condition exists.

In addition to one or more of the features described above, or as an alternative, the monitor module disconnects a power supply to the brake when the fault condition exists.

In addition to one or more of the features described above, or as an alternative, the monitor module determines the fault condition when either of the first monitor unit or the second monitor unit determines that there is less than complete correspondence between the first and second outputs.

In addition to one or more of the features described above, or as an alternative, complete correspondence between the first and second outputs requires an exact match between the first and second outputs.

In addition to one or more of the features described above, or as an alternative, the machine power switch module includes a first switch and a second switch, the brake power switch module includes a third switch and fourth switch, the first monitor unit monitors at least the first switch and the third switch, and the second monitor unit monitors at least the second switch and the fourth switch.

In addition to one or more of the features described above, or as an alternative, the first switch selectively disconnects the elevator drive from power, the second switch selectively disconnects the elevator drive from power, and the second switch is redundant of the first switch.

An illustrative example embodiment of a method is for monitoring an elevator control system that includes a drive configured to control power provided to an elevator machine, a machine power switch module configured to selectively disconnect the elevator machine from the power otherwise provided by the drive, and a brake power switch module configured to selectively disconnect a brake associated with the machine from power otherwise provided to the brake. The method includes using a first monitor unit to monitor a condition of each of the machine power switch module and the brake power switch module; using a second monitor unit to monitor the condition of each of the machine power switch module and the brake power switch module; generating a first monitor unit output including a current condition of the machine power switch module and a current condition of the brake power switch module as determined by the first monitor unit; generating a second monitor unit output including the current condition of the machine power switch module and the current condition of the brake power switch module as determined by the second monitor unit; and determining whether there is correspondence between the first monitor unit output and the second monitor unit output.

In addition to one or more of the features described above, or as an alternative, the method includes determining that there is a fault condition when there is less than complete correspondence between the first monitor unit output and the second monitor unit output.

In addition to one or more of the features described above, or as an alternative, each of the first monitor unit and the second monitor unit perform the determining whether there is correspondence between the first monitor unit output and the second monitor unit output, and the fault condition corresponds to at least one of the monitor units determining that there is less than complete correspondence between the first monitor unit output and the second monitor unit output.

In addition to one or more of the features described above, or as an alternative, the method includes disconnecting a power supply to the drive when the fault condition exists.

In addition to one or more of the features described above, or as an alternative, the method includes disconnecting power to the brake when the fault condition exists.

In addition to one or more of the features described above, or as an alternative, complete correspondence between the first monitor output and the second monitor output requires an exact match between the outputs.

The various features and advantages of at least one disclosed example embodiment will become apparent to those skilled in the art from the following detailed description. The drawings that accompany the detailed description can be briefly described as follows.

DETAILED DESCRIPTION

Figure 1:
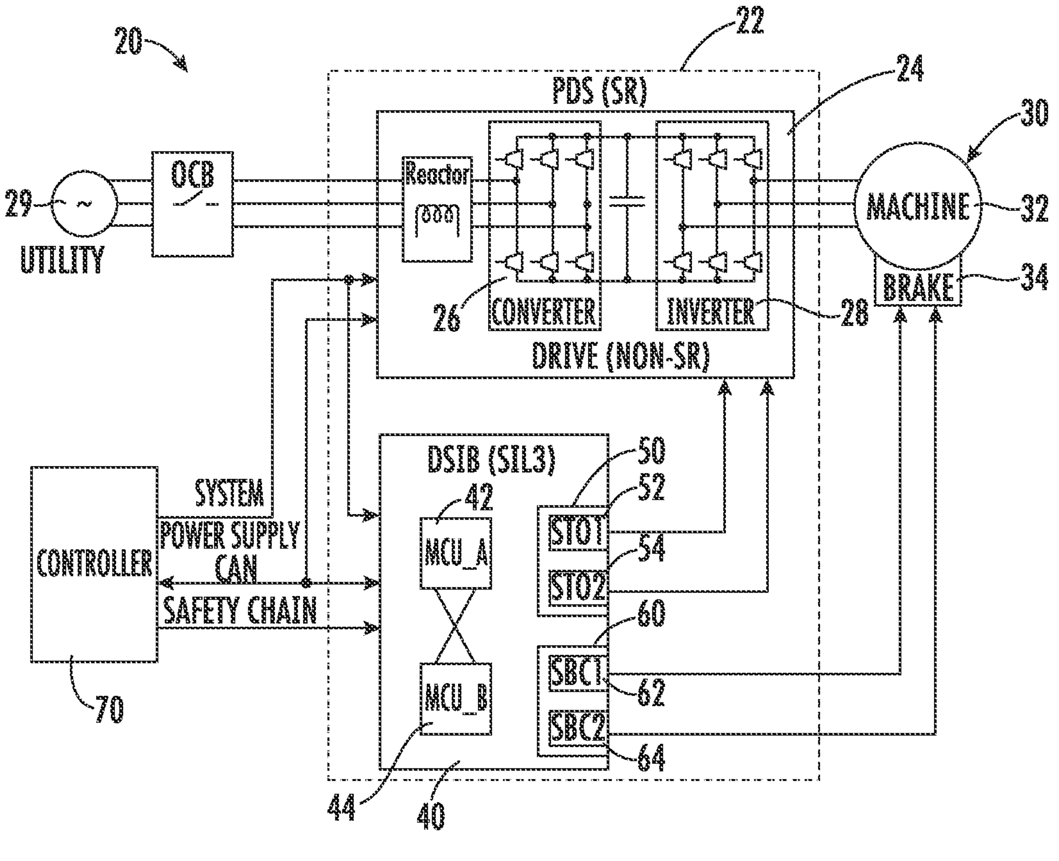
FIG. 1 schematically illustrates an example embodiment of an elevator control system.

FIG. 1 schematically illustrates an elevator control system 20. A drive 22 includes a power section 24 having at least a converter 26 and an inverter 28. The converter 26 and inverter 28 include switches, such as IGBT or MOSFET switches for example, that operate in a known manner to provide power from a source 29, such as a utility power grid, to an elevator machine 30.

The elevator machine 30 includes a motor 32 that provides the motive force for selectively moving an elevator car (not illustrated). The drive 22 provides power to the motor 32 in a manner that results in the necessary motor operation to achieve the desired movement or position of the elevator car. A brake 34 of the elevator machine 30 selectively applies a braking force that prevents associated motor components, such as a traction sheave, from moving to prevent movement of the elevator car. The brake 34 may have mechanically operative components, such as a spring, to apply the braking force in the absence of power supplied to the brake 34. For example, a brake coil is energized by electrical power to lift or release the brake under appropriate operating conditions.

A monitoring module 40 includes a first monitor unit 42 and a second monitor unit 44. In the illustrated example embodiment, each monitor unit 42, 44 comprises a microcontroller. The monitor units 42, 44 monitor operation states of switches used for disconnecting the elevator drive 22 and, therefore, the machine 30 from power under selected conditions.

In this embodiment, a machine power switch module 50 includes a first switch 52 and a second switch 54, which is a redundant or back up switch to the first switch 52 in this example embodiment. The first switch 52 and the second switch 54 each selectively disconnect the elevator drive 22 from power otherwise supplied to the elevator drive 22.

A brake power switch module 60 includes a third switch 62 and a fourth switch 64 that selectively disconnect the brake 34 from power otherwise supplied to the brake 34.

Figure 2:
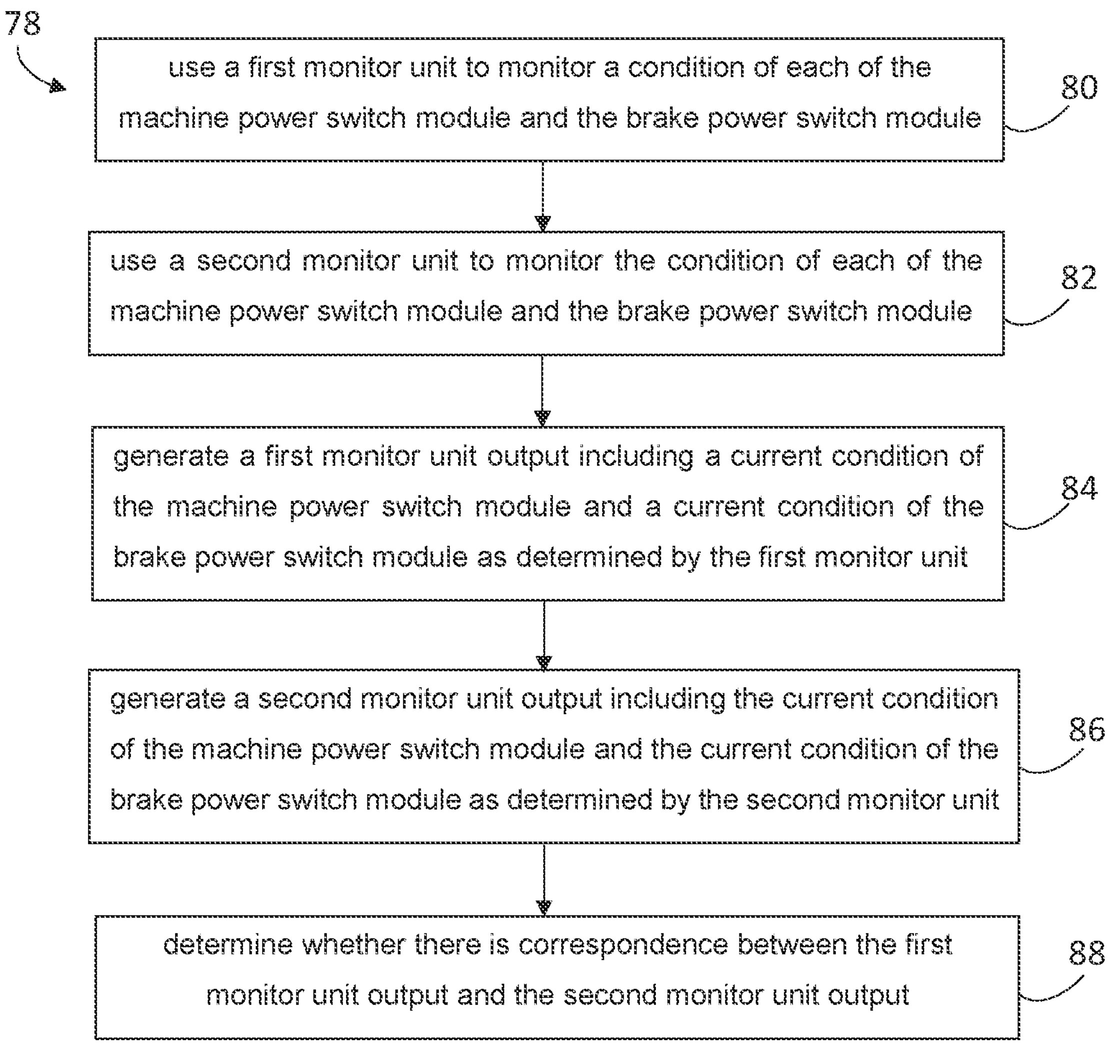
FIG. 2 is a flow chart diagram summarizing an example monitoring technique.

FIG. 2 includes a flow chart diagram 78 that summarize a monitoring technique useful with the illustrated embodiment. The first monitor unit 42 and the second monitor unit 44 each monitor the operation status of the machine power switch module 50 and the brake power switch module 60. In the illustrated example embodiment, at 80, the first monitor unit 42 monitors the operation status of the first switch 52 and the third switch 62. At 82, the second monitor unit 44 monitors the operation status of the second switch 54 and the fourth switch 64 in this embodiment.

The monitor units 42 and 44 communicate with each other and report the respective switch operation statuses monitored by that unit to the other monitor unit. The first monitor unit 42 generates a first monitor unit output at 84 including a current condition of the machine power switch module 50 detected by the first monitor unit 42 and a current condition of the brake power switch module 60 detected by the first monitor unit 42. The first monitor unit 42 provides the first monitor unit output to the second monitor unit 44. The second monitor unit 44 generates a second monitor unit output at 86 including a current condition of the machine power switch module 50 detected by the second monitor unit 44 and a current condition of the brake power switch module 60 detected by the second monitor unit 44. The second monitor unit 44, provides the second monitor unit output to the first monitor unit 42.

Each monitor unit 42, 44 is programmed or otherwise configured to determine at 88 whether there is correspondence between the first monitor unit output and the second monitor unit output. In other words, each monitor unit 42, 44 determines whether the conditions it monitors are the same as those monitored by the other monitor unit. Under normal or desired operating conditions, both monitor units 42 and 44 will report conditions or statuses that are the same. If one or more of the switch modules 50, 60 or one of the monitor units 42, 44 is not functioning properly, there will be less than complete correspondence between the monitor unit outputs.

The monitoring module 40 determines that there is a fault condition when there is less than complete correspondence between the monitor unit outputs. In the illustrated example embodiment, either of the monitor units 42, 44 may determine that the fault condition exists when that monitor unit 42, 44 determines that there is less than complete correspondence between the first and second monitor unit outputs.

The monitoring module 40 may perform different operations when a fault condition exists depending on the needs of a particular installation. In most embodiments, the monitoring module 40 will interrupt power otherwise supplied to the drive power section 24 to turn off power to the motor 32, and interrupt power from a brake power supply (not illustrated) to the brake 34. This will result in the brake 34 dropping and the elevator car will not be able to move until the fault condition has been addressed.

Another type of fault condition may exist that is detected or determined by both of the first and second monitor units 42, 44. For example, one of the switch modules 50, 60 may malfunction. In some situations, both monitor units 42, 44 will detect such a malfunction. The monitoring module 40 may address that type of fault condition, which does not involve a lack of correspondence between the monitor unit outputs, by taking appropriate action, such as shutting off power to the motor 32 and the brake 34 or reporting the fault to another portion of the system.

The monitoring module 40 in this example embodiment communicates with an elevator controller 70. The operation of and conditions monitored by the monitoring module 40 may be included as part of the information that is accessible through the controller 70 for remote elevator monitoring, for example.

The monitoring module 40 ensures the reliability of the drive 22 in a manner that enhances the ability of the control system 20 to satisfy higher or more stringent safety standards. The presence of the two monitor units 42 and 44 and the communication between them provides additional monitoring functionality and reporting that ensure that all switches of the switch modules 50 and 60 are operating properly. The conditions in which those switches should disconnect the drive power section 24 and the brake 34 from power are known to those skilled in the art and, therefore, are not described here.

The illustrated example embodiment provides reliability monitoring and reporting features that improve control features of the elevator system. Additionally, the reliability monitoring and reporting features allow for using different drive components and switch modules that can introduce performance enhancements and cost savings without compromising the reliability of the control system.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator control system, comprising:

a drive configured to control power provided to an elevator machine;

a machine power switch module configured to selectively disconnect the elevator machine from the power otherwise provided by the drive;

a brake power switch module configured to selectively disconnect a brake associated with the elevator machine from power otherwise provided to the brake; and a monitor module including a first monitor unit and a second monitor unit, each monitor unit being configured to monitor a condition of each of the machine power switch module and the brake power switch module, the first monitor unit being configured to provide a first output to the second monitor unit including a current condition of the machine power switch module and a current condition of the brake power switch module as detected by the first monitoring unit, the second monitor unit being configured to provide a second output to the first monitor unit including a current condition of the machine power switch module and a current condition of the brake power switch module as detected by the second monitoring unit, each of the monitor units being configured to determine whether there is correspondence between the first and second outputs.

2. The elevator control system of claim 1, wherein the monitor module determines a fault condition when there is less than complete correspondence between the first and second outputs.

3. The elevator control system of claim 2, wherein the monitor module disconnects a power supply to the drive when the fault condition exists.

4. The elevator control system of claim 2, wherein the monitor module disconnects a power supply to the brake when the fault condition exists.

5. The elevator control system of claim 2, wherein the monitor module determines the fault condition when either of the first monitor unit or the second monitor unit determines that there is less than complete correspondence between the first and second outputs.

6. The elevator control system of claim 2, wherein complete correspondence between the first and second outputs requires an exact match between the first and second outputs.

7. The elevator control system of claim 1, wherein the machine power switch module includes a first switch and a second switch, the brake power switch module includes a third switch and fourth switch, the first monitor unit monitors at least the first switch and the third switch, and the second monitor unit monitors at least the second switch and the fourth switch.

8. The elevator control system of claim 7, wherein the first switch selectively disconnects the elevator drive from power, the second switch selectively disconnects the elevator drive from power, and the second switch is redundant of the first switch.

9. A method of monitoring an elevator control system that includes a drive configured to control power provided to an elevator machine, a machine power switch module configured to selectively disconnect the elevator machine from the power otherwise provided by the drive, and a brake power switch module configured to selectively disconnect a brake associated with the machine from power otherwise provided to the brake, the method comprising:

using a first monitor unit to monitor a condition of each of the machine power switch module and the brake power switch module;

using a second monitor unit to monitor the condition of each of the machine power switch module and the brake power switch module;

generating a first monitor unit output including a current condition of the machine power switch module and a current condition of the brake power switch module as determined by the first monitor unit;

generating a second monitor unit output including the current condition of the machine power switch module and the current condition of the brake power switch module as determined by the second monitor unit; and determining whether there is correspondence between the first monitor unit output and the second monitor unit output.

10. The method of claim 9, comprising determining that there is a fault condition when there is less than complete correspondence between the first monitor unit output and the second monitor unit output.

11. The method of claim 10, wherein each of the first monitor unit and the second monitor unit perform the determining whether there is correspondence between the first monitor unit output and the second monitor unit output; and the fault condition corresponds to at least one of the monitor units determining that there is less than complete correspondence between the first monitor unit output and the second monitor unit output.

12. The method of claim 10, comprising disconnecting a power supply to the drive when the fault condition exists.

13. The method of claim 10, comprising disconnecting power to the brake when the fault condition exists.

14. The method of claim 10, wherein complete correspondence between the first monitor output and the second monitor output requires an exact match between the outputs.

* * * * *